Figure 1:
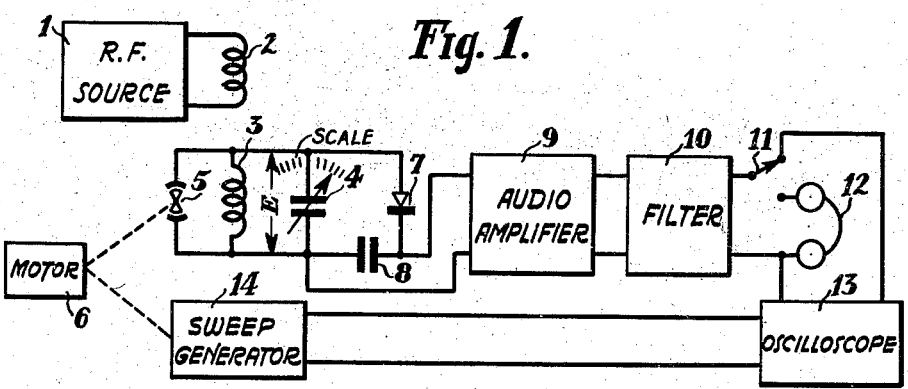

July 31, 1945.  C. A. ROSENCRANS  2,380,791

RESONANCE INDICATING APPARATUS

Filed May 28, 1942

Inventor
Charles A. Rosencrans
Attorney

Patented July 31, 1945

2,380,791

UNITED STATES PATENT OFFICE 2,380,791

RESONANCE INDICATING APPARATUS

Charles A. Rosencrans, Haddonfield, N. J., assignor to Radio Corporation of America, a corporation of Delaware Application May 28, 1942, Serial No. 444,928

2 Claims. (Cl. 250—39)

This invention relates generally to wave meters and particularly to an improved method and apparatus for detecting and indicating resonance of unmodulated continuous wave signals. The invention has particular utility in the measurement of unmodulated continuous wave signals of ultra high frequencies.

Heretofore various means have been devised for detecting and measuring the frequency of sources of unmodulated continuous waves. However, in most instances the measurement apparatus has had the inherent disadvantage that considerable power was necessarily absorbed from the signal source, whereby considerable reaction between the measuring apparatus and the signal source was encountered. Also various methods of modulating the signal source for the purpose of more readily measuring its frequency have been used, but such modulation invariably involved objectionable frequency shift in the signal source.

The instant invention contemplates a minimum of power absorption from the signal source under observation, and includes a simple and improved method of varying the reactance of a frequency calibrated tuned circuit in the indicating apparatus, whereby the resonance of the circuit is varied at some audible or predetermined frequency. Briefly, the invention includes a frequency calibrated tuned circuit which may be loosely coupled to the signal source. A small variable condenser is connected to the above mentioned resonant circuit, and is continuously varied by a suitable motor, to provide a variation of reactance in the resonant circuit at a frequency which may be easily detected and utilized to actuate a suitable indicator. In the apparatus described herein, the signal absorbed by the resonant circuit is detected by any suitable detector such as a crystal rectifier. The high frequency component of the detector output is bypassed through a suitable circuit such as a condenser, and the audio frequency component of the detector output is amplified and suitably filtered to provide an indication, on either a reproducer or an oscilloscope, of the frequency characteristics of the audio frequency component of the detector output. A tunable section of coaxial cable or a tunable parallel transmission line may be substituted for the conventional wave meter absorption circuit when the device is utilized for the measurement of ultra high frequencies.

Among the objects of the invention are to provide a simple and approved method of and apparatus for indicating resonance to a source of unmodulated continuous waves. Another object of the invention is to provide a simple method of and apparatus for continuously varying the resonance of a tuned circuit, detecting the energy absorbed by the tuned circuit from a source of unmodulated continuous waves, and indicating the frequency characteristics of the audio frequency component of the detector output. Still another object of the invention is to provide an improved method of and means for rejecting all except predetermined harmonic frequencies in the output of such a resonance indicating detector circuit. A further object of the invention is to provide an improved method of and means for utilizing a variable section of coaxial cable, continuously varying the resonance of the cable section at a predetermined audible frequency, detecting energy absorbed by the resonant cable section from a source of unmodulated continuous waves, and indicating the frequency characteristics of the audio frequency demodulation component. Another object of the invention is to provide an improved method of and means for utilizing a tunable parallel wire resonant line as a resonant circuit in the above mentioned apparatus.

Figure 2:
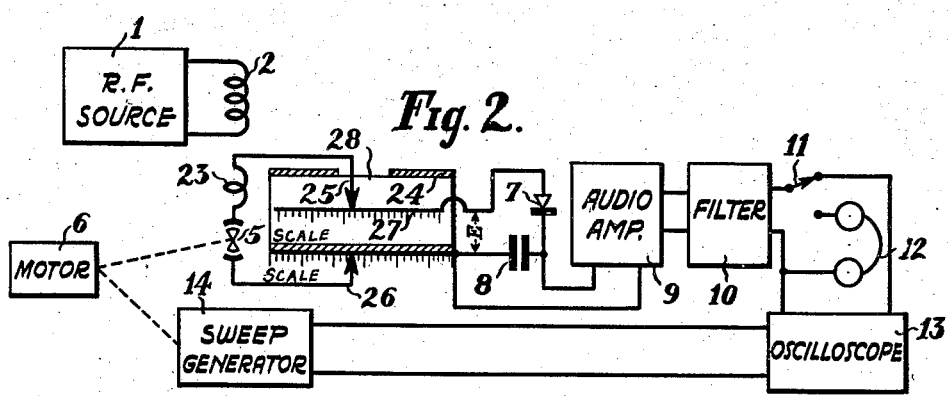
Figure 3:
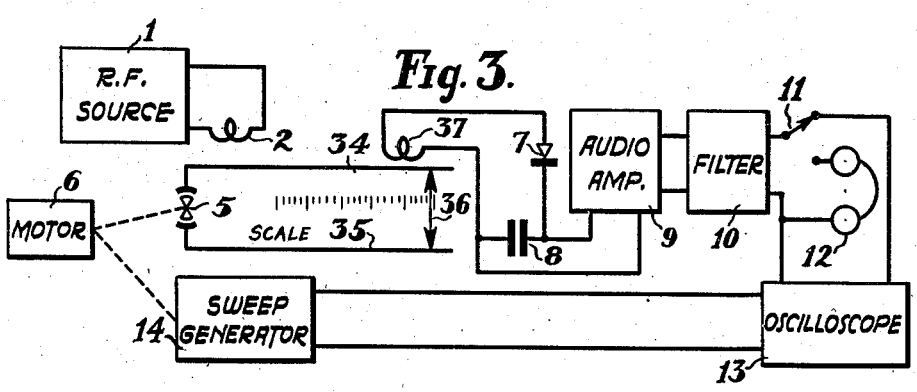
Figure 3:
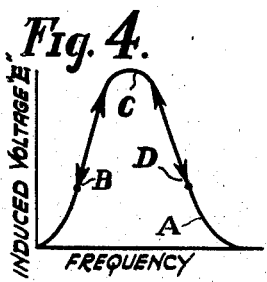
Figure 3:
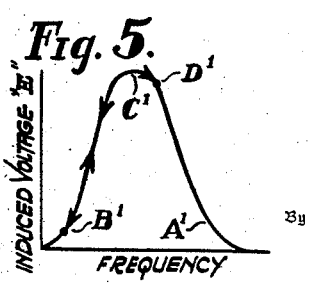

The invention will be described by reference to the drawing of which Figure 1 is a schematic circuit diagram of one embodiment of the invention, Figure 2 is a schematic circuit diagram of a second embodiment of the invention utilizing a tunable section of coaxial cable, Figure 3 is a schematic circuit diagram of a third embodiment of the invention utilizing a tunable parallel wire resonant line, and Figures 4 and 5 are graphs illustrating the variation of resonance in all three embodiments of the invention provided by the continuously variable reactive modulating condenser.

Referring to Fig. 1, a source of radio frequency energy 1, the frequency of which is to be measured, includes an output circuit represented by the inductance 2. Other means of energy radiation would be equally satisfactory, and it should be understood that the energy source is not a part of this invention. A frequency calibrated resonant circuit comprising the inductance 3 connected in parallel with a variable capacitor 4 includes a continuously variable condenser 5, connected in parallel therewith. The rotor plate of the condenser 5 is continuously rotated by means of a suitable motor device 6, to provide a continuous variation of the resonance of the tuned circuit 3, 4 and 5, at some audible or predetermined frequency. The resonant circuit is preferably loosely coupled to the coupling coil 2 of the source of unmodulated continuous waves 1, to minimize reaction thereon, and the energy absorbed by the circuit is detected by a suitable detector 7, which may be either a crystal rectifier or a thermionic vacuum tube. The high frequency demodulation component of the detector output is by-passed by a capacitor 8, while the audio frequency component is amplified by an audio amplifier 9, and applied to a suitable filter 10. The filter should preferably be designed to pass only the fundamental frequency of the audio frequency demodulation component derived from the continuously variable capacitor 5. However a filter tuned to pass only the second harmonic of the reactance variation frequency will also permit satisfactory resonance indication. The output of the filter 10 may be connected to a switch 11, for connection to either a reproducer 12 or an oscilloscope 13. A suitable sweep frequency generator 14 may be driven by the motor 6, synchronously with the capacitor 5 to provide a suitable source of sweep potentials for the deflecting elements of the oscilloscope 13 for deriving an appropriate cathode ray oscilloscope pattern to indicate the fundamental or second harmonic modulation frequencies derived from the resonant circuit.

In operation the resonance of the tuned circuit 3, 4, and 5 is adjusted until the signal output, at either the reproducer 12 or the oscilloscope 13, includes currents having maximum second harmonic content of the frequency of capacity variation produced by the continuously variable capacitor 5. The resonant frequency of the tuned circuit is determined from the calibration of the variable capacitor 4. For adjustments of the variable capacitor 4, either above or below the resonant frequency of the circuit, the second harmonic frequency amplitude will be considerably decreased, and the fundamental frequency content will increase, thereby providing a signal output which is the vector sum of the corresponding values of fundamental and second harmonic content. The ratio of fundamental to second harmonic content will vary continuously until the capacitor 4 is varied an amount corresponding to the maximum capacity variation of the continuously rotating capacitor 5 after which value the audible demodulation component of the detector output will decrease rapidly. When the filter 10 tuned to pass only the fundamental frequency is used, peaks will be indicated above and below resonance, with a null indication exactly at resonance. When the filter tuned to pass only the second harmonic is used, a peak will be indicated at resonance.

Fig. 2 is similar to Fig. 1 with the exception that a small pickup coil 23 is loosely coupled to the output coil 2 of the source of unmodulated continuous waves 1. A frequency calibrated tunable section of coaxial cable comprising an outer sheath 24, including an axial slot 28, and an inner conductor 27 is connected by sliding contacts 25 and 26 to the serially connected pickup coil 23 and the continuously variable capacitor 5, described heretofore. The output of the absorption circuit, including the coaxial cable section, the pickup coil 26 and the continuously variable capacitor 5, is detected and indicated as described in Fig. 1.

Fig. 3 is also similar to Fig. 1 with the exception that one end of a frequency calibrated tunable parallel transmission line including the parallel disposed conductors 34 and 35 is connected to the continuously variable capacitor 5. The line is loosely coupled to the output coil 2 of the source of continuous waves 1, and the resonance of the line is varied by a shorting bar 36 connected between the lines. Energy is derived from the line by a suitable coupling coil 37 and detected, amplified and indicated as described heretofore in Fig. 1.

Fig. 4 is a graph A indicating the variation of induced voltage E in the resonant circuit as the frequency is varied from the point B through resonance C to the point D by means of the continuously variable capacitor 5. This condition exists when the circuit is at resonance when the continuously variable capacitor is at approximately half of its maximum capacity. The setting of the variable capacitor 4, contacts 25, 26, or shorting bar 36 should be calibrated in terms of frequency of the energy source. It will be apparent that the circuit will be varied through resonance four times during each complete revolution of the rotatable plates of the continuously variable double rotor plate capacitor, and that therefore the demodulation component of the detector output will include twice the frequency of the capacity variation.

Fig. 5 is a similar graph A' showing the voltage E induced in the resonant circuit when the capacitor 4 is adjusted so that resonance C' occurs only when the continuously variable capacitor 5 is at almost its minimum capacity. The resonance of the circuit will thus vary from the point B' through resonance C' to the point D'. It will be apparent that the signal output of the detector 7 will include some second harmonic components but will consist principally of the fundamental frequency of the capacity variation, since in this instance the continuously variable condenser provides circuit operation principally on one side of the resonant curve.

I claim as my invention:

1. A signal resonance indicating circuit including an adjustable resonant circuit, a continuously variable reactor connected to said resonant circuit for varying the resonance of said circuit at a predetermined frequency, demodulating means connected to said resonant circuit, signal input means connected to said resonant circuit, means for deriving from said demodulating means currents including currents of said predetermined frequency and a predetermined harmonic thereof, and resonance indicating means responsive to said currents of said harmonic frequency for indicating the resonance of said resonant circuit to said signal as a function of the modulation harmonic frequency amplitude characteristics of said currents provided by said reactance modulation.

2. Apparatus of the type described in claim 1 in which said indicating means includes a cathode ray oscillograph, including a source of reference potentials and means connecting said source to said oscillograph for indicating the frequency characteristics of said currents.

CHARLES A. ROSENCRANS.